(12) United States Patent
Slattery et al.

(10) Patent No.: US 6,857,998 B1
(45) Date of Patent: Feb. 22, 2005

(54) COMPOSITIONS AND METHODS FOR TREATMENT OF SOLID WASTE

(75) Inventors: Michael P. Slattery, Rockford, IL (US); Cristopher Roy Proctor, South Beloit, IL (US)

(73) Assignee: Free Flow Technologies, Inc., Rockford, IL (US)

( * ) Notice: Subject to any disclaimer, the term of this patent is extended or adjusted under 35 U.S.C. 154(b) by 0 days.

(21) Appl. No.: 10/436,299

(22) Filed: May 12, 2003

Related U.S. Application Data

(60) Provisional application No. 60/379,902, filed on May 10, 2002.

(51) Int. Cl.$^7$ ................................................. B09B 1/00
(52) U.S. Cl. .................... 588/252; 588/236; 405/128.75
(58) Field of Search ................................ 588/252, 236; 405/128.1, 128.7, 128.75

(56) References Cited

U.S. PATENT DOCUMENTS

| | | |
|---|---|---|
| 3,375,063 A | 3/1968 | Bookey et al. |
| 3,676,165 A | 7/1972 | Schneider-Arnoldi et al. |
| 3,897,259 A | 7/1975 | Nakajima |
| 4,012,491 A | 3/1977 | Hauge |
| 4,017,324 A | 4/1977 | Eggers |
| 4,049,462 A | 9/1977 | Cocozza |
| 4,113,504 A | 9/1978 | Chen et al. |
| 4,124,405 A | 11/1978 | Quienot |
| 4,193,854 A | 3/1980 | Dmevich et al. |
| 4,354,876 A | 10/1982 | Webster |
| 4,356,030 A | 10/1982 | Halpin et al. |
| 4,375,986 A | 3/1983 | Pichat |
| 4,377,483 A | 3/1983 | Yamashita et al. |
| 4,384,923 A | 5/1983 | Hillekamp |
| 4,432,666 A | 2/1984 | Frey et al. |
| 4,436,555 A | 3/1984 | Sugama et al. |
| 4,496,267 A | 1/1985 | Gnaedinger |
| 4,536,409 A | 8/1985 | Farrell et al. |
| 4,601,832 A | 7/1986 | Hooykaas |
| 4,620,947 A | 11/1986 | Carlson |
| 4,623,469 A | 11/1986 | Conner |
| 4,629,509 A | 12/1986 | O'Hara et al. |
| 4,652,381 A | 3/1987 | Inglis |
| 4,671,882 A | 6/1987 | Douglas et al. |
| 4,687,373 A | 8/1987 | Falk et al. |
| 4,710,219 A | 12/1987 | Wahlberg, deceased et al. |
| 4,737,356 A | 4/1988 | O'Hara et al. |
| 4,764,284 A | 8/1988 | Jansen |
| 4,765,908 A | 8/1988 | Monick et al. |
| 4,777,026 A | 10/1988 | Griffith |
| 4,794,171 A | 12/1988 | Tagaya et al. |
| 4,878,944 A | 11/1989 | Rolle et al. |
| 4,889,640 A | 12/1989 | Stanforth |
| 4,950,409 A | 8/1990 | Stanforth |
| 5,037,479 A | 8/1991 | Stanforth |
| 5,431,825 A * | 7/1995 | Diel ........................... 210/719 |
| 5,916,123 A | 6/1999 | Pal et al. |
| 6,186,939 B1 * | 2/2001 | Forrester .................... 588/256 |
| 6,543,963 B2 * | 4/2003 | Bruso .................... 405/128.15 |
| 6,635,796 B2 * | 10/2003 | Pal et al. ........................ 588/2 |

OTHER PUBLICATIONS

Case History: Brass Foundry Sand, May 1, 2001.
Case Studies in Successful Foundry Hazardous Waste Treatment, AFS Transactions, 1987.
Constructive Use of Foundry Process Solid Wastes for Landfill Construction: A Case Study, AFS Transactions, 1987.
Foundry Waste Stabilization Laboratory Testing and Conceptual Design, AFS Transactions, 1985.
Industrial Pretreatment Technologies for Heavy Metal Removal and Treatment of Heavy Metal Sludges to Render Them Non–Hazardous, James E. Etzel, Nov. 3, 1988.
An Innovative Wastewater Treatment Process That Simultaneously Improves Effluent Quality and Reduces Heavy–Metals EP Toxicity, Ralph D. Grotelueschen.
The Leachability of Lead From Brass and Bronze Foundry Waste Sand Streams, AFS Transactions, 1988.
Leachate Tests on Selected Foundry Cupola Dusts and Sludges, AFS Transactions, 1981.
Leaching Behavior of Lead and Cadmium at Various PH Conditions, Residuals Management Technology, Inc., David L. Nagle, P.E. and Thomas P. Kunes, P.E.
Methods to Treat EP Toxic Foundry Wastes and Wastewaters, AFS Transactions, 1985.
Microencapsulation Process for Stabilizing Hazardous Industrial Eastes, Plant Engineering, Sep. 4, 1980.
Treatment of EP–Toxic Foundry Waste: Regulatory and Technical Overview, AFS Transactions, 1990.
Treatment of Hazardous Foundry Melting Furnace Dust and Sludges, AFS Transactions, 1983.
Treatment Metals Contaminated Sludges with Envirobond (TM), Tailings and Mine Waste '00, 2000.
Ultimate Disposal of Foundry Waste Sludges, AFS Transactions, 1977.
Use of Iron to Render Sludge from Ferrous Foundry Melting Furnace Emission Control Waste Nonhazardous, William A. Stephens, Thomas R. Stolzenburg, Robert R. Stanforth and James E. Etzel.

* cited by examiner

Primary Examiner—John Kreck
(74) Attorney, Agent, or Firm—Cook, Alex, McFarron, Manzo, Cummings & Mehler, Ltd.

(57) ABSTRACT

This invention relates to the treatment of contaminated materials including soils and solids to stabilize and reduce the mobility of heavy metal contaminated materials. Compositions and processes are disclosed for encapsulating and/or complexing certain heavy metals to render waste non-hazardous. Preferred treatment compositions include mixtures of monoammonium phosphate and bed ash which includes among other components, lime. The bed ash typically comprises lime, silicon dioxide, aluminum oxide, sulfur, and may comprise additional components such as, for example, magnesium oxide, and iron oxide. Processes are disclosed for using the treatment compositions at various application amounts, including relatively low application amounts, such as an amount of 5% by weight, to treat waste such as heavy metal contaminated soil to reduce the levels of certain heavy metals, and, in particular barium, to acceptable limits.

11 Claims, No Drawings

COMPOSITIONS AND METHODS FOR TREATMENT OF SOLID WASTE

This application claims the benefit to provisional application No. 60/379,902, filed May 10, 2002. This invention relates to the treatment of contaminated materials, including soils and solids, and in particular to the physical and chemical treatment of waste or solids containing high levels of heavy metals, and in particular, barium, by encapsulating and/or complexing the heavy metals to control leaching of the heavy metals such that the metals will not leach at unacceptable levels into ground water under naturally occurring conditions.

BACKGROUND AND DESCRIPTION OF THE INVENTION

The potential dangers of hazardous waste, and in particular, heavy metals such as lead, arsenic, chromium, copper and cadmium, have been well documented and the subject of regulatory control in order to reduce or eliminate the dangers to people directly and to the surrounding environment. Solid wastes are classified as hazardous by both federal and state agencies and regulations. For example, 40 C.F.R., Part 261.24(a) (revised as of Jul. 1, 2001), contains a list of contaminants and their associated maximum allowable concentrations. If a contaminant, such as lead, exceeds its maximum allowable concentration, when tested using the Toxicity Characteristic Leaching Procedure (TCLP) analysis as specified at 40 C.F.R. Part 261.11, then the material is classified as exhibiting the characteristic of toxicity. Waste containing leachable barium (Ba) is currently classified as hazardous waste due to the toxicity characteristic, if the level of lead extracted in a TCLP analysis is above 100.0 milligrams per liter (mg/L) or parts per millions (ppm).

The TCLP test is designed to simulate a worst case leaching situation, that is leaching conditions which would typically be found in the interior of an actively degrading municipal landfill. Such landfills normally are slightly acidic with a pH of approximately 5.+−.0.5. Additionally, the leaching medium is normally heavily buffered by volatile organic acids, for example acetic acid produced by the facultative anaerobic degradation of organic matter. The U.S. Environmental Protective Agency (EPA) has also designed a Multiple Extraction Procedure (MEP) to evaluate the long term stability of waste by determining levels of leachable levels of elements of concern. The TCLP test is a single extraction of waste tumbling in an acetic acid extract for 18+/−2 hours. The extract is filtered, digested and analyzed to establish the leachability of the element of concern, for example lead. If the determined value is equal to or greater than the limit for that element, the waste is hazardous and must be managed. The MEP test is meant to simulate 1,000 years of leaching with acid rain and consists of a single TCLP extraction followed by 9 extractions on the same sample with a nitric/sulfuric acid extract having a pH of 3.

The prior art includes disclosures of various compositions and methods for treating waste to reduce the leachability of certain heavy metals, including in particular lead. There still, however, exists a need for improved treatment compositions and methods for reducing the leachability of heavy metals, such as barium. The present invention provides a method of reducing the leachability of certain heavy metals, and, in particular, barium, with relatively low amounts of treating compositions;

It is therefore an object of the present invention to provide an improved treatment method for heavy metals, and, in particular, for barium.

Another object of the present invention is to provide a method for treating heavy metals, and in particular, barium, to reduce the leachable levels of barium to be within acceptable limits using the TCLP test.

Another object of the present invention is to provide a method for treating heavy metals, and in particular, barium, to reduce the leachable levels of barium to be within acceptable limits using the MEP test.

Another object of the present invention is to provide a treatment process for heaving metals, and, in particular, barium which is economical to use.

Another object of the present invention is to provide a treatment process for heaving metals, and, in particular, barium which is relatively easy to use.

These objects and other objects and advantages of the invention are accomplished by utilizing a treatment composition comprising lime (calcium oxide), sulfur (in sulfate form or a form which can be oxidized to such form, such as, for example, $SO_3$), and phosphate compounds. A preferred treatment composition comprises phosphate and bed ash containing lime.

An especially preferred treatment composition comprises (in % w/w), 5–10% silicon dioxide, 40–60% calcium oxide, 0–5% aluminum oxide—non-fibrous, 10–25% sulfur (in sulfate form or a form which can be oxidized to such form, such as, for example, $SO_3$), 0–5% magnesium (e.g. magnesium oxide), 0–5% iron (e.g. iron oxide), and 10–30% phosphate compounds. In accordance with the preferred aspects of the invention the phosphate is selected from calcium phosphates including but not limited to, triple super phosphate and super phosphate calcium phosphates, and ammonium phosphates including, but not limited to, monoammonium phosphate, and more preferably powdered monoammonium phosphate. In that regard, a preferred grade of powdered monoammonium phosphate is the powdered monoammonium phosphate commercially sold by IMC Global Inc. under the product name MAP-Powder.

The non-phosphate components can be supplied by bed ash containing lime. Mintek Resources Inc. supplies a preferred source of such a bed ash containing lime, commercially under the trademark CALCIMENT®. As presently advised, a typical composition of CALCIMENT contains about, on a percent weight basis, 53.1% calcium oxide (CaO), 9.7% silicon dioxide, 3.69% aluminum oxide ($Al_2O_3$), 24.42% sulfur ($SO_3$), 0.88% magnesium (which is reported as magnesium oxide, MgO), and 2.16% iron oxide ($Fe_2O_3$)

The treatment compositions of the present invention can be readily prepared by blending bed ash containing lime, such as CALCIMENT of the above-identified composition, with a phosphate source, such as, powdered monoammonium phosphate such as IMC's MAP-Powder. Preferably blends for the treatment composition comprise, on a percent by weight basis, between 40–90% CALCIMENT, and between 10–60% MAP-Powder; more preferably the blend comprises, on a percent by weight basis, 50–80% CALCIMENT and 20–50% MAP-Powder; a yet more preferred blend comprises, on a percent by weight basis about 75%+/− 5% CALCIMENT and about 25%+/−5% MAP-Powder; and still more preferably the blend comprises, on a percent by weight basis about 75% CALCIMENT and about 25% MAP-Powder.

The treating composition is applied to the waste and throughly mixed therewith. The moisture content of the waste can range from exceptionally dry to exceptionally wet. However, for ease of application, the moisture content of the waste is preferably, typically in the range of 25% to 35%. While not necessarily necessary for performance, if desired the moisture content of the waste can be adjusted up or down to facilitate application of the treating composition. For example, water can be added to the waste to increase the moisture content of the waste and if the waste is considered too wet then water can be removed either through evaporation (natural or assisted) or through the addition of fillers. Preferably between about 2% to about 15% of treatment material to the amount of waste, on a percent by weight basis, is used to treat the waste. More preferably, between about 5% to about 10% of treatment material to the amount of waste, on a percent by weight basis, is used to treat the waste. Most preferably between about 5% of treatment material to the amount of waste, on a percent by weight basis, is used to treat the waste.

Applicants have unexpectedly discovered that barium contaminated waste can be effectively treated to reduce the barium levels within EPA acceptable limits with an application rate of about 5% by weight of a treatment composition comprising about 75% CALCIMENT and about 25 MAP-Powdered. The treatment material and any drying agents are preferably thoroughly mixed with the waste in order to facilitate contact between the, free barium and the treatment material. It is hypothesized, without being limited to any particular theory of the invention, that the treatment process of the present invention, results from the release of ammonia and phosphates when the treatment compositions are hydrated. The phosphates appear to recombine as calcium phosphates. The ammonia prevents the formation of calcium sulfate complexes, and allows for the formation of very insoluble barium sulfate complexes. The strong buffering capacity of the treatment compositions protects against the release of metals back in solution in an acidic environment. The treatment compositions appear to maintain their effectiveness after they are hydrated and are allowed to dry.

Set forth below is a detailed example demonstrating the use and effectiveness of the present invention. In that regard, the following text refers to the use of Free Flow 100 (FF100) and the composition of the referenced FF100 is the preferred formulation discussed above of about 75% CALCIMENT and about 25 MAP-Powdered. It will be appreciated by those skilled in that art that while the preferred aspects of the present invention are disclosed, that modifications and variations may be made without departing from the spirit and scope of the present invention.

FF100 has been successfully applied to-a variety of heavy metal impacted soils on both a bench-scale study basis and full-scale projects.

One full-scale project (RCRA site in Sycamore, Ill.) involved the in-situ treatment of 1,400 tons of heavy metals contaminated foundry sand and soil. Metals of concern were chromium, copper, lead, nickel and zinc. The objectives of the project were to reduce the total levels for all metals below established cleanup objectives as well as reduce TCLP levels for lead below 0.1 mg/L. The table below shows the untreated and treated levels for all metals of concern for this project. The soils were treated with an application rate of 6% (by weight) of FF100. The FF100 was applied using a front-end loader and then blended with the contaminated soils to a depth of 18 inches using a tiller. Treatment confirmation samples were collected using a grid system. Those grids that did not meet cleanup objectives were subjected to another treatment of FF100 at a lower dosage rate and then re-sampled. In-situ treatment resulted in all soils meeting the established cleanup objectives for all metals of concern.

TABLE 3

RCRA Site, Sycamore, Illinois Treatment Results

| | Total Chromium (mg/kg) | Total Copper (mg/kg) | Total Lead (mg/kg) | TCLP Lead (mg/L) | Total Nickel (mg/kg) | Total Zinc (mg/kg) |
|---|---|---|---|---|---|---|
| Remediation Objective | 28 | 2,900 | 400 | 0.1 | 1,600 | 23,000 |
| Un-treated soils | 826 | 10,098 | 3,383 | 42.9 | 48,835 | 5,003 |
| Treated soils | 23.6 | 1,703 | 294 | <0.03 | 53.1 | 598 |
| % Reduction | 97.1% | 83.1% | 91.3% | 99.9% | 99.9% | 88.0% |

In July 2001, a bench-scale treatability study was conducted to evaluate the effectiveness of FF100 metals treatment on lead impacted soils from a gun range (shooting/rifle range) located in Illinois. The objective of the project was to treat the lead impacted soils so that the soil could be disposed of as non-hazardous waste. The impacted soil had total lead levels as high as 1,500 mg/kg. The bench study resulted in a recommended application dosage of 3% (by weight) with TCLP results of 0.881 mg/L. The resulting project involved the treatment of approximately 3,000 tons of lead impacted soil.

Also in July 2001, a bench-scale treatability study was conducted to evaluate the effectiveness of FF100 metals treatment on lead impacted soils from a gun range (shooting/rifle range) located in Ohio. The objective of the project was to treat the lead impacted soils so that the soil could be disposed of as non-hazardous waste. The impacted soil had total lead levels as high as 6,500 mg/kg. The bench study resulted in a recommended application dosage of 5% (by weight) with TCLP results of 1.33 mg/L. The resulting project involved the treatment of 2,500 tons of lead impacted soil.

The use and application of FF100 is designed to be a very simple operation. Ninety percent (90%) of the time effective metals treatment is achieved after the first application. Various methods can be used in the application of FF100. The majority of the time the FF100 product is applied to impacted soils using an agricultural spreader or a front-end loader. The metals stabilization product performs best if the soil is at or near its natural moisture content. The reason for this is because of the need to treat in the 24-inch lift. The relationship between additive, soil grains and moisture is important when attempting to till in 24-inch lifts with an approximate 1-inch thick layer of additive. If the engineer determines that the impacted soils contain excess water then additional tilling will be required to dry soils to obtain the proper moisture content prior to the application of FF100. The dryer the soils the easier it is to blend the FF100 with the impacted soils.

The use of FF100 does not require any pH adjustment of the soil prior to application. The pH of FF100 is neutral (approximately 7) and the effectiveness of treatment is not affected by the pH of the soils to be treated. The only adjustment that may be necessary is to dry the soils to ensure proper and easier blending of the FF100 and impacted soils.

Information obtained from the bench-scale treatability, studies indicates that a treatment dosage of 5% by weight is effective for treating the metals impacted soils. Treatment of the impacted soil sample with 5% by weight of FF100 resulted in TCLP levels well below the TCLP limits listed in Table 4 below. It should be noted that the soil samples received for the bench-scale study had a pH of approximately 7.0 and contained approximately 30% moisture and treatment with FF100 was effective. Even though treatment was effective at 30% soil moisture content, it is preferred to have the soil moisture content lower for easier and proper blending of the soil and additive in the field.

TABLE 4

Metals Treatment Criteria

| Metal | TCLP Limits (mg/L) | Universal Treatment Standards (UTS, mg/L TCLP) | 10 × UTS (mg/L TCLP) |
|---|---|---|---|
| Arsenic | 5.0 | 5.0 | 50.0 |
| Barium | 100.0 | 21.0 | 210.0 |
| Cadmium | 1.0 | 0.11 | 1.1 |
| Chromium | 5.0 | 0.60 | 6.0 |
| Lead | 5.0 | 0.75 | 7.5 |
| Mercury | 0.2 | 0.025 | 0.25 |
| Selenium | 1.0 | 5.7 | 57.0 |
| Silver | 5.0 | 0.14 | 1.4 |

After the WBPLF soils are prepared in Trench 6 and Trench 7 in accordance with specifications, a round of soil sampling will take place to determine the initial (pre-treatment baseline) concentrations of metals in the soils. Metals sampling (for initial pretreatment baseline determination and final post-treatment verification) will consist of the collection and preparation of one five-point composite soil sample from each treatment grid area or "cell", not to exceed 300 cubic yards of soil in any treatment grid area or "cell". Therefore, based on a 24-inch treatment lift, one five-point composite soil sample will be prepared and analyzed per 4,050 (maximum) square feet of treatment area. The five soil samples collected for each composite soil sample will be collected from the full soil treatment depth (0 to 24 inches) at each discrete sample location and then combined in a stainless steel bowl. Composite soil samples will be systematically quartered and re-quartered until the correct volume is achieved for each analytical sample. Each composite soil sample will be collected and prepared in a manner designed to ensure that it is representative of the soil within its respective treatment area or "cell".

Initial pre-treatment and final post-treatment verification soil samples will all be sent to an off-site USACE-certified laboratory for TCLP extraction using SW-846 Method 1311 followed by metals analyses using EPA Method 6010B/7470 procedures. In accordance with standard project QC procedures, approximately 10 percent of all soil samples sent to the primary laboratory will be split and analyzed in duplicate. In addition, at the direction of the USACE project chemist, QA split samples for approximately 10 percent of the final post-treatment metals soil samples will be sent to another USACE-approved laboratory for an independent check of the primary laboratory's analytical results.

There are a number of possible layouts for the treatment area grids and soil sample locations within Trench 6 and Trench 7. The actual treatment area grids and soil sampling locations will be adjusted in the field based on actual soil volumes and treatment areas and dimensions; however, no grid area (or treatment "cell") will exceed 300 cubic yards of soil. The treatment area grids will be laid out in the field with a tape measure. Pin flags (or equivalent) will be used to delineate the corners of each grid area (or treatment "cell"); however, pin flags and/or other field marking options will be used judiciously to prevent possible damage to buried landfill liners.

As determined during their site-specific treatability study, WBPLF soils requiring treatment for metals (and currently stockpiled in Trench 6 and Trench 7) are expected to require one FF100 treatment to achieve remediation objectives. The single FF100 treatment is expected to reduce the concentration of metals below the TCLP limits listed in Table 4 above. The following steps roughly define the FF100 treatment cycle for metals contaminated soil:

1. Divide each trench into "treatment rows" for the application of FF100 product.
2. Visually determine if soils are to wet for effective treatment of soils.
3. Distribute FF100 evenly over each "treatment row" at the specified dose of 5% by weight. Verify proper dosage application before proceeding to the next step.
4. Initially till each "treatment row" in at least one direction (i.e. N-S) before proceeding to the next "treatment row" in the trench.
5. Repeat steps 2 through 4 for each "treatment row" until FF100 has been applied to the entire trench and the entire trench has been initially tilled in at least one direction (i.e. N-S).
6. After the entire trench has been treated with FF100 and initially tilled in one direction, then till the entire trench in two directions (N-S and E-W) to ensure complete blending of FF100 and impacted soil. Determine if FF100 has been thoroughly blended with impacted soils.

These steps are described in additional detail in the following paragraphs.

Step 1 requires that Trench 6 and Trench 7 be laid out in "treatment rows". The "treatment rows" are necessary to ensure that the FF100 product is applied at the specified dosage. The FF100 product will not be applied to the entire trench and then tilled. Free Flow requires that the FF100 product be applied to a "treatment row" before proceeding to the next row. This helps to ensure proper application of the FF100. For example, if Trench 7 is divided into 3 "treatment rows" A, B and C, it is recommended that row A be treated with FF100 and initially tilled in one direction prior to proceeding to the next row. After the FF100 product has been applied to row A and-tilling has begun then the application of the FF100 product to the next row can begin. This operation can continue as long as time permits during the course of the operating day. In other words, if time does not permit the application and initial tilling of the FF100 product to the next "treatment row" then the operation will have to wait until the next operating day.

Step 2 consists of visually inspecting the soils in Trench 6 and Trench 7 to ensure the proper moisture content prior to the application of the FF100 product. If it is engineer determined that the soils are too wet then additional tilling of the soils will be required to reduce the moisture content prior to the application of the FF100 product.

Step 3 consists of uniformly distributing the FF100 product over the "treatment row(s)" specified. The process of distributing the metals treatment product over the entire treatment area will be completed using a LGP tractor equipped with a front-end loader. The FF100 metals treatment product will be delivered to the site in 1-ton (2000 pound) sacks and will be dispersed by placing the materials in the bucket of a front-end loader and slowly discharging the materials (by gently tipping the bucket) as the vehicle is driven over the treatment area. An on-site engineer can supervise/direct this operation to ensure that the material is adequately distributed, as uniformly as possible, across the "treatment row(s)". Based upon the results of a site-specific IAAAP-WBPLF treatability study, the application rate for the FF100 product is 5 percent by weight.

Step 4 involves a tilling process to initially mix the treatment additive with the soil. After the required additives are evenly distributed over the "treatment row(s)", the soil tilling process will be initiated. The objective of this tilling is to initially mix the additive into the soil. Initially, the tilling will take place in one direction (i.e. North-South) over the "treatment row(s)" currently being treated. The on-site engineer will direct this initial tilling operation.

Step 5 involves repeating steps 2 through 4 until the all "treatment rows" in the entire treatment area (trench) have been initially treated and tilled in one direction. Once the entire treatment area (trench) has been initially treated then proceed to step 6.

Step 6 involves a tilling process to thoroughly mix the treatment product with the soil. This tilling operation is in addition to the initial tilling operation completed in step 4. To ensure this mixing process is thorough, the tilling is performed in a minimum of two directions. Initially, the tilling will take place in a north-south direction over the entire treatment area (trench) and then the soil will be tilled in an east-west direction. The on-site engineer will direct the tilling operation until the mixing is determined to be complete. Test holes will be dug at random locations and the soil will be visually inspected to ensure thorough mixing of the soil and treatment additive throughout the entire 24-inch treatment lift and across the entire treatment area. The thorough soil tilling operation is expected to take 2 to 3 days in Trench 6 and 1 to 2 days in Trench 7. Upon completion of this step the entire treatment area (trench) will have been tilled a minimum of three times (twice in one direction and once in the other direction).

The application of the FF100 product will be completed using equipment (1 bulldozer and 2 Massey Ferguson tractors, one of which has the tilling equipment attached to it) that has already been mobilized to the site for use in the explosives treatment process.

Following successful treatment, all WBPLF soils remaining in Trench 7 will be transferred into Trench 6; Trench 6 provides for control and long-term management of the treated soils, as specified in the ROD. Trenches 6 and 7 will then be graded, as required, to promote drainage toward the water collection systems located at the south end of each trench. Trench 6 and Trench 7 will both be prepared for winter operations via implementation of USACE-directed maintenance-minimization measures (e.g., precipitation-resistant soil covers). At the completion of site restoration, equipment and all miscellaneous facilities will be demobilized, followed by demobilization of project personnel.

Preferably an engineer will be mobilized to the IAAAP before the initiation of metals treatment activities. The engineer will remain on-site while metals treatment activities are occurring. The soils for treatment will remain in the same 24-inch lifts used during the explosives treatment process. The FF100 additive will be shipped to the site in 1-ton (2000 pound) sacks. Application of the FF100 metals stabilization product will be accomplished using equipment (1 bulldozer and 2 Massey Ferguson tractors, one of which has the tilling equipment attached to it) that has already been mobilized to the site for use in the explosives treatment process. The entire metals treatment process is estimated to take approximately 10 to 12 days (including mobilization/demobilization).

TABLE 5

FF100 Metals Contaminated Soil Treatment Process

| Treatment Step | Operation | Remarks/QC Parameters | Estimated Duration |
|---|---|---|---|
| 1 | Establish "treatment rows" in Trench 6 and Trench 7 prior to application of FF100 metals treatment additive. | | 0.5 day (maximum) |
| 2 | Decide if soil moisture content is appropriate for application of metals treatment additive. | If soil is determined to be too wet, then additional tilling will be required to dry the soil prior to application of metals treatment additive. | Variable |
| 3 | Surface application of FF100 additive to specified "treatment row(s)". | Uniformly distribute additive via north-south and east-west surface applications; visually inspect to verify uniform coverage of entire "treatment row(s)". | Included in step 5 time estimate |
| 4 | Initially till "treatment row(s)" in one direction before proceeding to next row(s). | Till "treatment row(s) in one direction to initially mix treatment additive with soils. | Included in step 5 time estimate |
| 5 | Repeat steps 2 through 4 until all "treatment rows" in the entire treatment area (trench) have been treated and initially tilled in one direction. | When all of the "treatment rows" within the trench have been treated and initially tilled then proceed to step 6. | 1–2 days per trench |
| 6 | Thorough tilling of trenches in two directions and verification of thorough mixing by Free Flow engineer. | Till in north-south and east-west directions. Dig small test holes at appropriate locations and visually inspect soils to ensure thorough mixing of soil and treatment additive throughout the entire 24-inch treatment lift and across the entire treatment area (trench). | 1–3 days per trench |
| | | Total estimated metals treatment (Trench 6 and 7) | 10 days |

If final sampling TCLP results show that any sampling grid has failed the metals treatment process (meaning TCLP analytical results greater than the TCLP limits listed in Table 4 above), that grid will be retreated with an application dosage of approximately 2% by weight.

On Apr. 19, 2001 two (2) 5-gallon containers of soil sample were received from an IAAAP site located in Middletown, Iowa. One of these containers was labeled "untreated" and the other was labeled "treated". During the site walk, the following items were mentioned to all vendors attending;

1) The "untreated" container would contain soil that had not been treated with portland cement and synthetic gypsum.

2) The "treated" container would contain soil that had been unsuccessfully treated with portland cement and gypsum.

3) Both the "treated" and "untreated" containers would contain soil that had been treated with the DARAMEND biological additives for explosives remediation.

Upon receipt of these above soil samples, bench-scale treatability study for metals treatment was performed. Multiple samples from each container were collected and weighed. Based on the weight of each sample different percentages (by weight) of FF100 were added to each sample and thoroughly mixed. These samples along with untreated samples from each container were then submitted to AEA Laboratories for analysis of TCLP barium, moisture content and pH. The following table summarizes the results obtained from this treatability study.

Results of April 2001 Treatability Study

| Sample Description | Moisture Content % | pH | Barium (mg/L) | Bulk Density (g/ml) |
|---|---|---|---|---|
| "Untreated" IAAAP soil plus 10% FF100 | — | — | 4.80 | — |
| "Untreated" IAAAP soil plus 15% FF100 | 25.3 | 10.0 | 15.3 | — |
| "Untreated" IAAAP soil plus 20% FF100 | — | — | 5.86 | — |
| "Untreated" IAAAP soil | 31.0 | 6.5 | 374 | 1.81 |
| "Treated" IAAAP soil plus 10% FF100 | 27.3 | 10.0 | <0.011 | — |
| "Treated" IAAAP soil plus 15% FF100 | — | — | <0.011 | — |
| "Treated" IAAAP soil | 30.3 | 7.0 | 0.501 | 1.76 |

"Untreated" = IAAAP soils not treated with portland cement and synthetic gypsum
"Treated" = IAAAP soils unsuccessfully treated with portland cement and synthetic gypsum In August of 2001, the treatment of metals impacted (all RCRA metals this time) at the Iowa Army Ammunition Plant (IAAAP) located in Middletown, Iowa was revisited It seems that the scope of work for the metals treatment project was changed to include all RCRA metals not just Barium. It was determined that Barium was the primary metal of concern along with Lead and Cadmium as secondary metals of concern based on statistical analysis of the provided data. Another bench-scale treatability study for metals treatment was conducted, focusing on barium, lead and cadmium with overall treatment of all RCRA metals. A composited sample of "untreated" and "treated" IAAAP soils was mixed with 5% (by weight) of FF100. This single sample was submitted to AEA Laboratories for analysis of TCLP Barium, TCLP Cadmium and TCLP Lead. The results obtained from this treatability study were 9.3 mg/L Barium, <0.033 mg/L Cadmium, and <0.274 mg/L Lead.

Based on the results of the above treatability studies, applicants are confident that an application dosage of 5% by weight of FF100 will effectively treat the metals impacted soils for all RCRA metals.

The table below shows the results of bench-scale treatability studies wing FF100 and the types of soils or waste streams they were performed on.

Miscellaneous Projects Treatability Studies Results

| Sample type | Untreated lead (mg/L) | Treated lead (mg/L) | % Reduced | Untreated Cadmium (mg/L) | Treated Cadmium (mg/L) | % Reduced | Dosage (% by weight) |
|---|---|---|---|---|---|---|---|
| Brass Foundry Sand | 22 | 0.21 | 99.0% | 0.280 | <0.004 | 98.6% | 4% |
| Brass Foundry Sand | 68 | 0.017 | 99.98% | 0.388 | <0.004 | 99.0% | 3% |
| Manufacturing Facility Soils | 65 | 0.266 | 99.6% | — | — | | 4% |
| NPL Site Soils | 140 | 0.088 | 99.9% | — | — | | 4% |
| Foundry Cupola Baghouse Dust | — | — | | 1.65 | <0.005 | 99.7% | 10% |
| Foundry Cupola Baghouse Dust | 132 | <0.004 | 99.99% | 1.56 | <0.0046 | 99.7% | 4% |
| Foundry Cupola Quench Dropout | 102 | <0.004 | 99.99% | 1.44 | <0.0046 | 99.7% | 5% |
| Electric Arc Furnace Baghouse Dust | 11.2 (13.4pH) | 0.211 | 98.1% | — | — | | 20% |

-continued

Miscellaneous Projects Treatability Studies Results

| Sample type | Untreated lead (mg/L) | Treated lead (mg/L) | % Reduced | Untreated Cadmium (mg/L) | Treated Cadmium (mg/L) | % Reduced | Dosage (% by weight) |
|---|---|---|---|---|---|---|---|
| Contaminated Soils | 190 | 0.088 | 99.95% | — | — | | 4% |
| Refinery Soils | 1.5 | <0.03 | 98.0% | — | — | | 5% |
| Foundry Sand Fill Area | 65 | 0.112 | 99.8% | — | — | | 6% |
| Battery Recycler Site Soils | 972 | <0.004 | 99.99% | — | — | | 15% |

We claim:

1. A method of treating solid hazardous waste containing greater than 100 mg/L leachable barium to reduce the levels of leachable barium contained within said waste, the method comprising mixing said solid waste containing more than 100 mg/L leachable barium with at least one first agent comprising bed ash containing lime, wherein said bed ash includes a sulfur component in sulfate form or a form which can be oxidized to sulfate form, and a second agent, said second agent being a phosphate agent selected from the group consisting of alkali metal phosphates, alkaline earth metal phosphates, and phosphoric acid, phosphate agents.

2. The method of claim 1 wherein said phosphate agent is selected from the group consisting of monammonium phosphate, calcium phosphate and phosphoric acid, phosphate agents.

3. A method for reducing the level of leachable barium contained within a solid product, containing greater than 100 mg/L leachable barium, said treatment material comprising a composition composed of bed ash containing lime wherein said bed ash includes a sulfur component in sulfate form or a form which can be oxidized to sulfate form and a phosphate agent;

tilling said treated product in at least one given direction; and further tilling said treated product in a direction generally transverse to said at least one given direction.

4. The method of claim 3 wherein said phosphate agent is selected from the group consisting of ammonium phosphate and calcium phosphate, phosphate agents.

5. The method of claim 4 wherein said phosphate agent is monoammonium phosphate.

6. The method of claim 4 wherein said phosphate agent is triple super phosphate.

7. The method of claim 4 wherein said phosphate agent is super phosphate.

8. The method of claim 3 wherein the dose of said treatment composition is in the range of about 2% to about 15% of treatment material to the amount of said solid product, on a percent by weight basis.

9. The method of claim 8 wherein said dose is in the range of about 5% to about 10% of treatment material to the amount of solid product.

10. The method of claim 8 wherein said dose is about 5% of treatment material to the amount of solid product.

11. The method of claim 3 further including the step of defining a grid pattern for solid product, said grid pattern comprising sections, said treatment material being applied to one or more sections, sequentially.

* * * * *